(12) United States Patent
Luciani et al.

(10) Patent No.: US 9,807,010 B2
(45) Date of Patent: Oct. 31, 2017

(54) CONGESTION DETECTION IN MOBILE NETWORKS AND DELIVERY OF CONTENT IN NON-CONGESTED CONDITIONS

(71) Applicant: Akamai Technologies, Inc., Cambridge, MA (US)

(72) Inventors: James Luciani, Acton, MA (US); Terence A. Lobo, Acton, MA (US); Prasandh Balakrishnan, Brookline, MA (US)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 0 days.

(21) Appl. No.: 14/732,183

(22) Filed: Jun. 5, 2015

(65) Prior Publication Data

US 2016/0359747 A1 Dec. 8, 2016

(51) Int. Cl.
*H04L 12/801* (2013.01)
*H04L 12/26* (2006.01)

(52) U.S. Cl.
CPC .......... *H04L 47/11* (2013.01); *H04L 43/0882* (2013.01); *H04L 43/50* (2013.01); *H04L 47/12* (2013.01)

(58) Field of Classification Search
CPC ..... H04L 43/0882; H04L 43/50; H04L 47/11; H04L 47/12
See application file for complete search history.

(56) References Cited

U.S. PATENT DOCUMENTS

| | | | |
|---|---|---|---|
| 7,251,688 B2 | 7/2007 | Leighton et al. | |
| 7,274,658 B2 | 9/2007 | Bornstein et al. | |
| 7,904,505 B2 | 3/2011 | Rakers et al. | |
| 7,921,196 B2 | 4/2011 | Harrang et al. | |
| 8,583,820 B2 | 11/2013 | Harrang et al. | |
| 8,589,508 B2 | 11/2013 | Harrang et al. | |
| 8,589,585 B2 | 11/2013 | Harrang et al. | |
| 8,671,203 B2 | 3/2014 | Harrang et al. | |

(Continued)

OTHER PUBLICATIONS

Chakraborty, Abhijnan et al., "Coordinating Cellular Background Transfers using LoadSense", Proceedings of ACM Mobicom '13, Sep. 30-Oct. 4 2013, downloaded Aug. 9, 2016 from https://www.microsoft.com/en-us/research/publication/coordinating-cellular-background-transfers-using-loadsense/, including web page overview and article, Sep. 2013, 15 pages.

(Continued)

*Primary Examiner* — Ajay Cattungal

(57) ABSTRACT

Disclosed herein are methods and systems for detecting congestion in a mobile network and for determining those end-user mobile devices that are affected. In one embodiment, a server communicates with a set of mobile devices, on which have been installed a suitable client application. At certain times, the server initiates a congestion detection routine. The server may request the mobile devices to report on their current wireless attachment point to the mobile network. The server can then test for congestion by performing a data transfer between itself and the mobile clients, which may be in either direction. The server can use the results to determine whether a given attachment point is congested. In one embodiment, a dynamically selected, random subset of mobile devices for a current attachment point are tested, and the result is imputed to all mobile devices similarly situated.

18 Claims, 5 Drawing Sheets

(56) References Cited

U.S. PATENT DOCUMENTS

| | | | |
|---|---|---|---|
| 8,719,399 B2 | 5/2014 | Harrang et al. | |
| 8,812,722 B2 | 8/2014 | Harrang et al. | |
| 8,824,289 B2 | 9/2014 | Gormley et al. | |
| 8,832,305 B2 | 9/2014 | Harrang et al. | |
| 8,886,790 B2 | 11/2014 | Harrang et al. | |
| 2004/0082341 A1* | 4/2004 | Stanforth | G01C 21/206 455/456.1 |
| 2006/0025154 A1* | 2/2006 | Alapuranen | H04W 4/02 455/456.1 |
| 2007/0271375 A1 | 11/2007 | Hwang et al. | |
| 2008/0104231 A1 | 5/2008 | Dey et al. | |
| 2008/0201225 A1 | 8/2008 | Maharajh et al. | |
| 2009/0143065 A1* | 6/2009 | Mattila | H04L 41/06 455/423 |
| 2010/0070628 A1 | 3/2010 | Harrang et al. | |
| 2010/0121941 A1 | 5/2010 | Harrang et al. | |
| 2010/0198943 A1 | 8/2010 | Harrang et al. | |
| 2010/0274871 A1 | 10/2010 | Harrang et al. | |
| 2011/0029664 A1 | 2/2011 | Harrang et al. | |
| 2011/0044227 A1 | 2/2011 | Harrang et al. | |
| 2011/0047286 A1 | 2/2011 | Harrang et al. | |
| 2011/0047287 A1 | 2/2011 | Harrang et al. | |
| 2011/0170412 A1* | 7/2011 | Ramadas | H04L 47/10 370/235 |
| 2011/0279312 A1* | 11/2011 | Thomson | G01S 19/05 342/357.47 |
| 2011/0312386 A1 | 12/2011 | White | |
| 2011/0320607 A1 | 12/2011 | Harrang et al. | |
| 2012/0244863 A1 | 9/2012 | Burnette et al. | |
| 2013/0046879 A1 | 2/2013 | Garcia et al. | |
| 2013/0117134 A1 | 5/2013 | Burnette et al. | |
| 2013/0124679 A1 | 5/2013 | Harrang et al. | |
| 2013/0124747 A1 | 5/2013 | Harrang et al. | |
| 2013/0331077 A1* | 12/2013 | Mucke | H04W 76/06 455/418 |
| 2014/0003243 A1 | 1/2014 | Nadas et al. | |
| 2014/0067997 A1 | 3/2014 | Saabas et al. | |
| 2014/0105019 A1 | 4/2014 | Harrang et al. | |
| 2014/0119184 A1 | 5/2014 | Harrang et al. | |
| 2014/0219089 A1 | 8/2014 | Ericson et al. | |
| 2014/0222967 A1 | 8/2014 | Harrang et al. | |
| 2015/0019746 A1 | 1/2015 | Shatzkamer | |
| 2015/0031327 A1* | 1/2015 | Townley | H04W 16/18 455/405 |
| 2015/0245259 A1* | 8/2015 | Marcum | H04W 36/0083 455/437 |

OTHER PUBLICATIONS

Hewlett-Packard, Solution Overview, Control RAN congestion, Dec. 2013, 8 pages.

Nokia White Paper, Nokia Solutions and Networks, Cell load and application-aware traffic management, Nov. 2013, 20 pages.

RADCOM, Omni-Q for Mobile Data Service Assurance, 2011, 5 pages.

Cisco web page, Cisco Quantum Services Bus Products & Services Cisco, downloaded Apr. 21 2015, http://www.cisco.com/c/en/us/products/wireless/quantumservicesbus/index.html.

Cisco solution overview, Cisco Quantum Services Bus: Enable Any-to-any communication to optimize and monetize Network Intelligence, 2014.

U.S. Appl. No. 14/584,770, filed Dec. 29, 2014.

U.S. Appl. No. 14/584,820, filed Dec. 29, 2014.

Miquel M. Raga, "An Android application for crowdsourcing 3G user experience", Report from Polytechnic Univ. of Valencia, Sep. 2011.

OpenCellID Wikipedia entry, downloaded May 18, 2015, last modified date of Dec. 17, 2014, http://en.wikipedia.org/wiki/OpenCellID.

OpenCellID wiki, Menu map view, downloaded May 18, 2015, last modified date of Apr. 26, 2015, http://wiki.opencellid.org/wiki/Menu_map_view.

OpenCellID wiki, What is OpenCellID, downloaded May 18, 2015, last modified date of Mar. 2, 2015, http://wiki.opencellid.org/wiki/What_is_OpenCellID.

Dovrolis, C. et al., "Packet-dispersion techniques and a capacity-estimation methodology," Networking, IEEE/ACM Transactions on, vol. 12, No. 6, pp. 963-977, Dec. 2004.

* cited by examiner

CONGESTION DETECTION IN MOBILE NETWORKS AND DELIVERY OF CONTENT IN NON-CONGESTED CONDITIONS

BACKGROUND

Technical Field

This application relates generally to mobile networks, to the detection of congestion in such networks, and to content delivery to mobile client devices in such networks.

Brief Description of the Related Art

Sometimes a mobile network becomes congested with network traffic. The congestion often affects a subset of end-user mobile devices, for example those that are connected to a given radio cell of the radio access network. Congestion might also occur at deeper layers in the network, such as in the evolved packet core (EPC). When a mobile network—or a particular portion thereof—is congested, it may be undesirable to send content to currently affected end-user mobile devices. It is also undesirable for the affected mobile device to request content at that time, if possible.

It is known to actively test for congestion in a given communication channel by sending data down that channel, and analyzing the results of the test data transfer. This kind of testing can be useful if one does not want to, or have access to, passive monitoring for the channel. However, such active testing potentially adds to network congestion.

The teaching hereof address the problem of congestion in mobile networks and delivery of content in non-congested conditions. They provide improved technical systems and methods for assessing and detecting network congestion. The teachings herein address these needs and also provide other benefits and improvements that will become apparent in view of this disclosure.

BRIEF DESCRIPTION OF THE DRAWINGS

The invention will be more fully understood from the following detailed description taken in conjunction with the accompanying drawings, in which.

DETAILED DESCRIPTION

Figure 1:
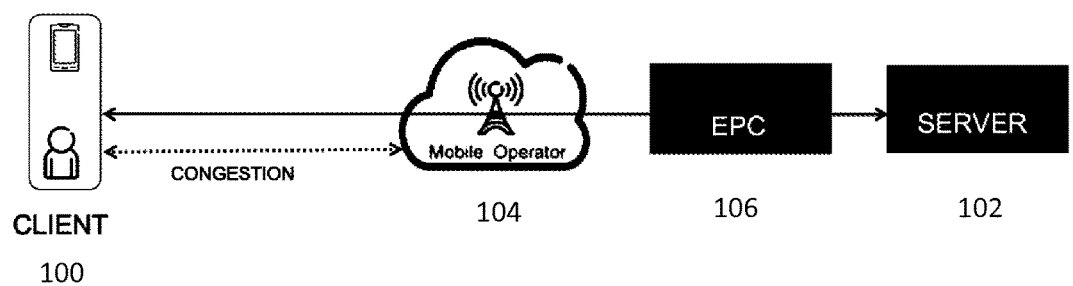
FIG. 1 is a schematic diagram illustrating an embodiment of a system showing where congestion may occur in the mobile network, according to the teachings hereof.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example." It should also be noted that the allocation of functions to particular machines is not limiting, as the functions recited herein may be combined or split amongst different computing machines in a variety of ways.

Disclosed herein are methods and systems for detecting congestion in a mobile network and for determining those end-user mobile devices that are affected. In one embodiment, a server communicates with a set of mobile devices, on which have been installed a suitable client application. The server may run a dedicated congestion monitoring application and may be offering content server delivery functions, e.g., it may run an HTTP proxy server as function as a delivery node in a content delivery network, or otherwise provide content to the mobile devices.

According to one embodiment, at certain times, the server initiates a congestion detection routine. The server may request the mobile devices to report on their current wireless attachment point to the mobile network. In response, the mobile devices may respond with—for example—their current geographical location, which can be mapped to radio cell, or with an identifier of a given radio cell, or associated base station, or other information. The server can then test for congestion by performing a data transfer between itself and the mobile clients, using the results to determine whether a given radio cell is congested. The test transfer can be in the upstream or the downstream direction, such that congestion in each direction can be measured independently. According to the current embodiment, not all mobile clients are necessarily tested. Rather, the server selects a sample of mobile devices (preferably randomly), and measures congestion to this subset. The results are used to assign a congestion status to both the mobile devices that were actually tested, and to other mobile devices sharing a common attachment point (typically, the same radio cell). The selection and testing is done synchronously, so as to be able to assess real-time conditions in the network based on current location and current congestion.

The dynamic sampling mentioned above may be performed in a variety of ways. For example, the server may first select a subset of mobile devices that it is aware of (e.g., the client applications that it is speaking to). The server can then ask them to report on their wireless attachment point and measure congestion to them, aggregating results by common wireless network attachment point. In another embodiment, the server may first get the information on attachment points, then select a given attachment point to test for congestion, and selects a subset of the mobile devices known to be attached to that attachment point. In some cases, the dynamic sampling set may be subject to a minimum threshold number of mobiles devices needed to initiate congestion testing. A maximum limit may also be imposed.

Preferably, mobile devices are equipped with a suitable client application that communicates with the server to perform the processes described herein. Such communication preferably occurs at the application layer. The server can initiate the congestion routine, request and receive information regarding the attachment point, and perform the data transfer using application layer messaging. This not a requirement of the teachings hereof, however.

As those skilled in the art will appreciate, the techniques described herein may be performed by a server regardless of its deployment or its access to mobile network infrastructure. The server may be located outside the mobile network, e.g., external to a packet data network gateway (PGW) function and potentially on the public Internet. Alternatively, the server may be deployed inside a mobile network core (e.g., evolved packet core).

Additional embodiments with greater detail are now described.

FIG. 1 illustrates one embodiment of a congestion measurement system. The end user mobile device 100, with client application executing thereon, has a communication channel to a server 102. The communication channel 102 is provided via a mobile network and more particularly via a radio access network 104 and evolved packet core EPC 106. It should be understood that reference to particular mobile network components is by way of example only, and that the teachings hereof apply to any mobile network, including those commonly referred to as 2G/3G/4G/LTE generation. Note that a gateway component (e.g., PDN gateway or PGW function) typically resides in between the EPC 106 and the server 102, but is not shown here for convenience of illustration. The server 102 may also be deployed interior to the PGW. The radio access network 104 is made up of one or more radio cells. The radio cells, physically, are provided by cell towers which are located throughout a geographic area to provide suitable coverage. The radio cells are typically connected to a base station that provides connectivity into the EPC 106. As shown in FIG. 1, congestion is preferably measured in the radio access network, and more particularly at the granularity of the radio cell. In some cases, a group of radio cells may share a given base station and in such cases it may be preferable to detect congestion at the base station level.

Figure 2:
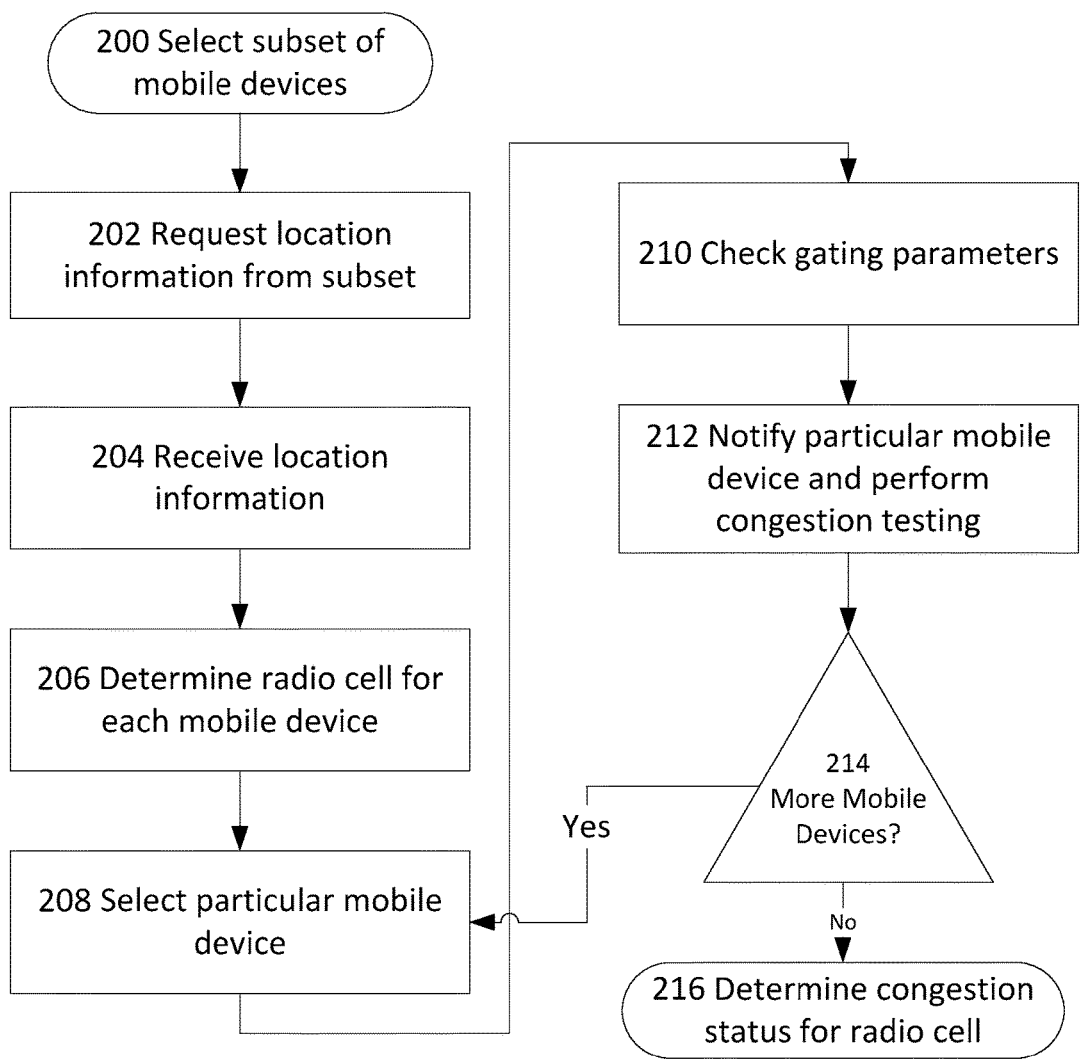
FIG. 2 is a flowchart illustrating an embodiment of a congestion detection routine operable in the server shown in FIG. 1.

With reference to FIG. 1 and FIG. 2, an exemplary operation in the system of FIG. 1 proceeds as follows:

The server 102 knows of a set of end user mobile devices 100 upon which a suitable client application has been installed. The server 102 selects a subset of mobile devices to monitor for congestion (200). This selection may be a random selection. The server 102 sends a message to the client applications of the selected mobile devices requesting that they send their geographic location (202). Upon receiving this information (204), the server 102 can determine the radio cell for the mobile device 100 (206). It does this based on a map of geographic location to radio cell location. Preferably, the server 102 maintains a database of radio cell to geographic mapping. There are a variety of ways of obtaining the data for the mapping. For example, the server can access a pre-determined database of radio cell to geographic location mapping which has been collected (e.g., from FCC registration information or otherwise) and made available, as is known in the art (e.g., the opencellid.org project provides such a database). It is also possible to obtain the data from the mobile network providers, e.g., via suitable lookup. A third way is to learn it from the client. The client application (an Android-based application) can send the radio cell information along with the geographic information. Note that in this third embodiment, the client application may have access to a mobile network interface that would allow it to query the mobile network and send to the server 102 an identifier for the radio access network and more specifically for the radio cell to which it was attached. This information can be sent and directly identify the radio cell for the server 102.

The server 102 determines if a given mobile device 100 (that has reported its location) should be selected for congestion monitoring and measurement (208). This determination can be made based on the mapped radio cell, the number of mobile devices that are currently in that cell, and other factors. In some cases, the radio cell may have been recently checked for congestion so another check is not needed. If the radio cell is due for a test, then the mobile device 100 may be selected. If the server 102 selects a given mobile device 100, the server 102 notifies that mobile device 102 that it has been selected (212).

Note that the server 102 may check certain gating parameters before initiating a congestion test (210). For example, the server 102 may check a time of day policy that specifies the days and/or times of days during which a mobile device is eligible for congestion monitoring or to download data. If the download is allowed by policy, the server 102 may also check if the associated radio cell is historically congested at this point in time. If it is not normally congested, then the server 102 sends a message to the selected mobile device to start the congestion detection process (212).

The congestion detection process may proceed in the upstream or downstream direction. This means that congestion can be detected in each direction, independently. In some cases, congestion may occur in one direction but not in the other and the teachings hereof can determine this. The teachings hereof accommodate this situation but are not limited by it.

Assume that the test will be in the upstream direction. In one embodiment, the selected mobile device 100 sends a burst of UDP packets (a packet train) with a predetermined interval (inter-packet interval) between each packet towards the server 102. The interpacket interval is included in the packet payload. The server 102 receives the packets. Based on the expected interpacket interval (deduced from the interval specified in the payload) and the observed interpacket interval, the server 102 can calculate available bandwidth and a congestion score which is used to indicate (e.g., via threshold level comparison) whether congestion is considered to be present and/or the severity of such. A technique using interpacket interval is known in the art (such as Dovrolis et al., "Packet-dispersion techniques and a capacity-estimation methodology") and can be used. Other suitable techniques can be used. Measuring congestion in the downstream direction may be accomplished in a similar manner. For example, the client application in the mobile device 100 can receive the packet train and either calculate the congestion score and determine congestion, or can simply report back the raw data of the observed interpacket times to the server 102 for the server's use in determining congestion.

The server 102 can select other mobile devices for testing, if there are others. Aggregate results for a given radio cell may be considered. Congestion status is determined, based on the level of congestion (216). If there is no congestion, then the server 102 knows that data transfers between the mobile devices and the server 102 (or other servers) may take place. For example, the server 102 can notify the mobile devices to start downloading content from the server 102 (or other servers). If there is congestion, then the server 102 initiates congestion detection process again at a later time.

Generalizing, at 216, the server determines whether a given radio cell is considered to be congested. If so, then the server 102 sets up to check later on if the radio cell is still congested. If not, then the server 102 sends a notification to the mobile devices in the radio cell to initiate downloading.

Periodically the mobile device 100 will update its geographic location to the server 102. Upon change of geographic area, the server 102 may determine that congestion monitoring is not needed in the new area and indicate this to the mobile device 100.

Figure 3:
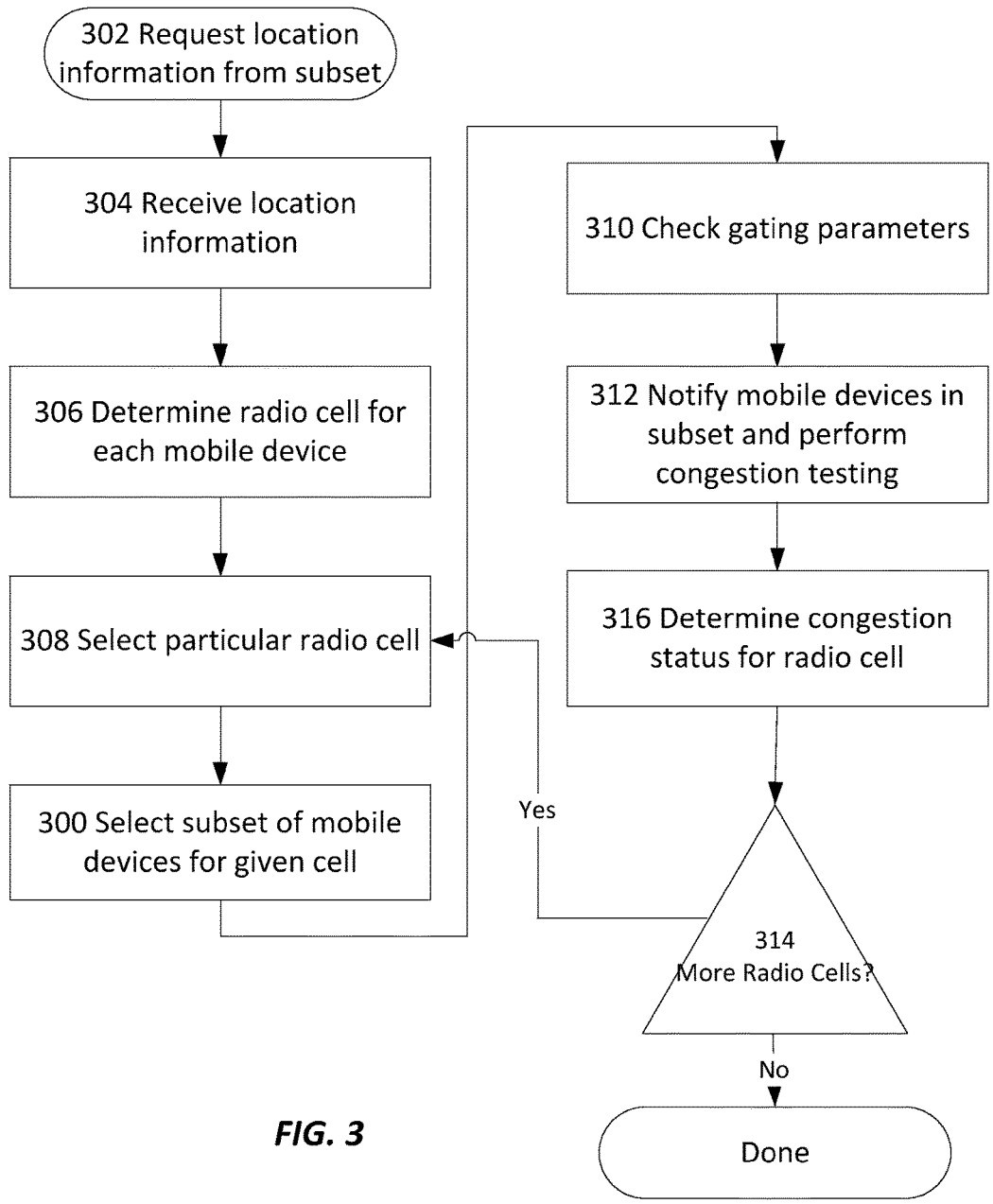
FIG. 3 is a flowchart illustrating an embodiment of a congestion detection routine operable in the server shown in FIG. 1.

FIG. 3 provides an alternate workflow, which differs from that shown in FIG. 2 in that the mobile devices are first asked for their location information (302). After receiving it and mapping mobile devices to radio cells, a given radio cell is selected and a subset of the mobile devices in that radio cell are (e.g., randomly) selected for testing (304-308, 300). In other respects, the workflow proceeds analogously to that shown in FIG. 2. Thus gating parameters are checked (310), selected mobile devices are notified and congestion detected (312), and the congestion status of the radio cell is determined (316). If congestion is low enough, then the server 102 sends a notification to the mobile devices in the radio cell to initiate downloading.

Figure 4:
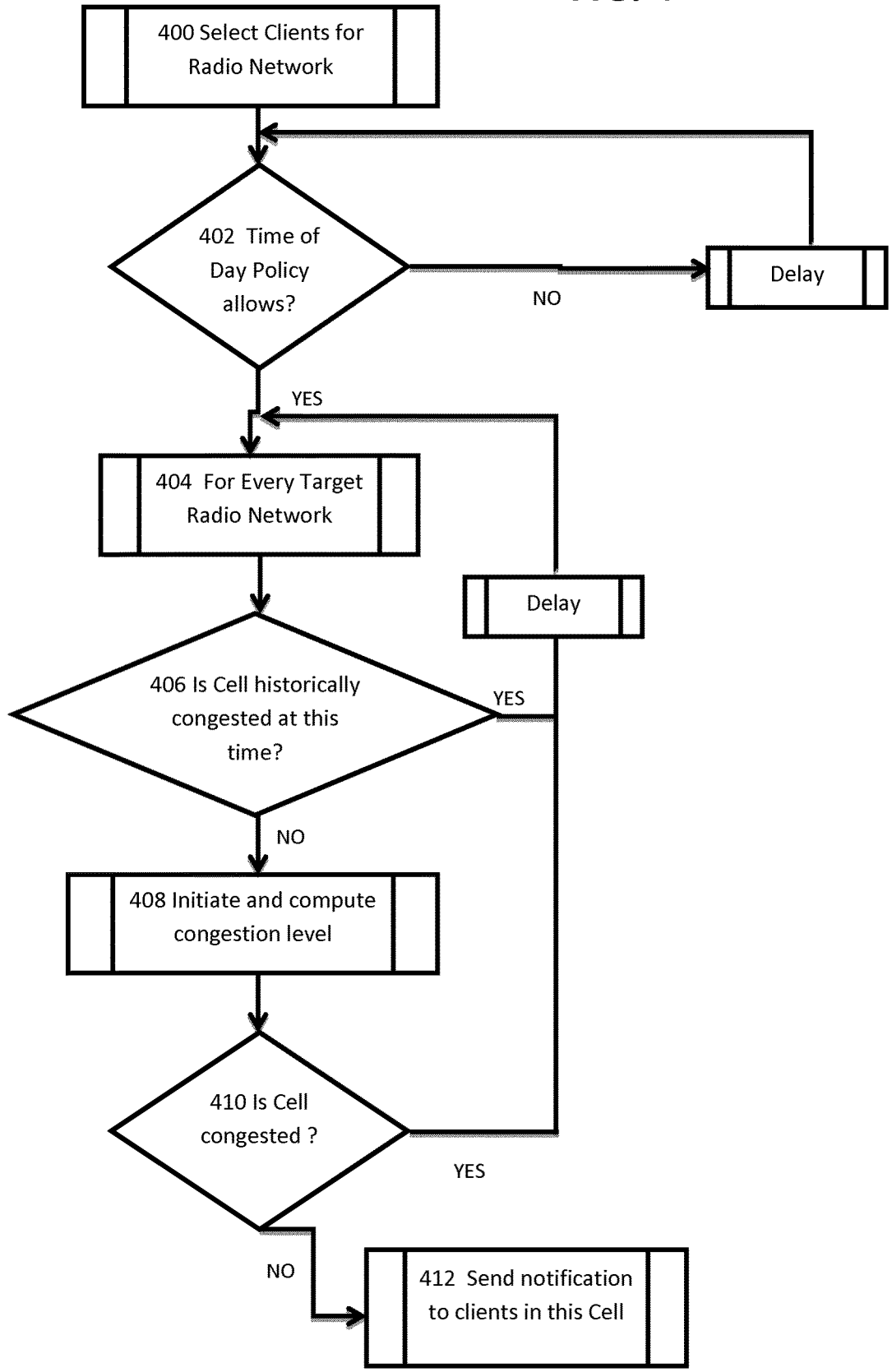
FIG. 4 is a flowchart illustrating an embodiment of a congestion detection routine operable in the server shown in FIG. 1; and, FIG. 5 is a block diagram illustrating hardware in a computer system that may be used to implement the teachings hereof.

FIG. 4 is a flowchart of an exemplary workflow operable at the server 102 that highlights the gating parameters in more detail (which was 210 in FIG. 2; 310 in FIG. 3). The workflow begins at 400, where the server 102 selects mobile devices. At 402, the server 102 determines whether a time of day policy would allow a mobile device 100 to download content (i.e., even if there were no congestion, a policy may prohibit downloading at certain times of day). If not, then congestion monitoring is delayed for another time. If so, then control moves to 404. At 404-406, for every target radio cell, the server 102 determines whether that radio cell is historically congested at that day/time. If so, then congestion monitoring is delayed. If not, then control moves to 408 and the server initiates the congestion detection process described above.

Use Cases

Congestion detection such as that described herein can be used in many situations. As suggested above, one use case is for push notifications. For example, a client "push" system may involve sending a notification to a client application running on a mobile device to download content that has been communicated to the mobile device in a manifest. Preferably the manifest lists content, such as video clips, that have been selected for the end user. Upon receiving the notification, the client application begins to request the items on the manifest from the server. The downloaded items can be stored on the mobile device for subsequent viewing by the end user. Particularly since the requests are not user-initiated, it is preferable that such notifications are sent in non-congested conditions. The teachings hereof can be used to determine if current network conditions are conducive for content delivery. This avoids making an already congested situation worse. If conditions are congested the notifications can be delayed until conditions improve.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
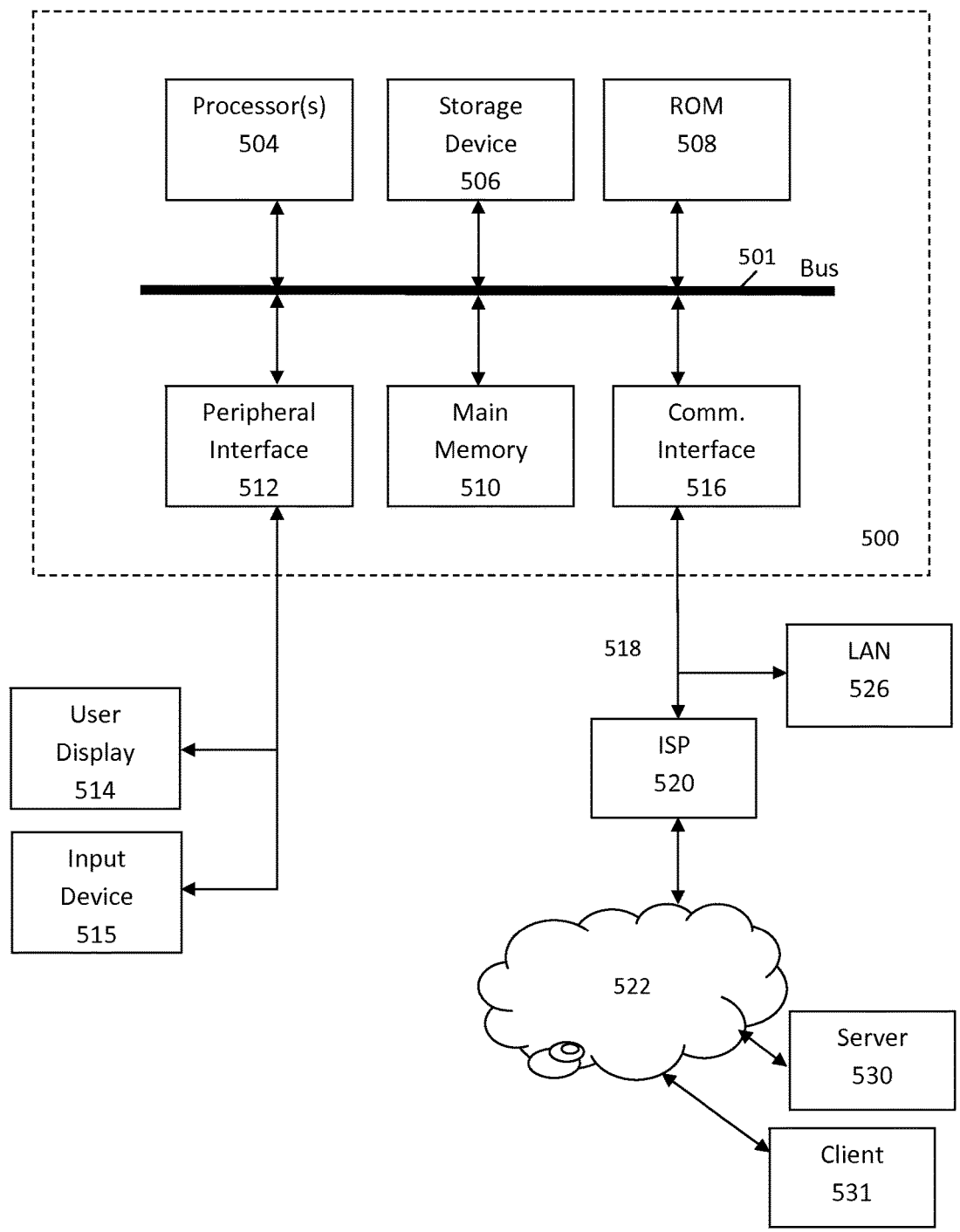

FIG. 5 is a block diagram that illustrates hardware in a computer system 500 on which embodiments of the invention may be implemented. The computer system 500 may be embodied in a client device, server, personal computer, workstation, tablet computer, wireless device, mobile device, network device, router, hub, gateway, or other device.

Computer system 500 includes a microprocessor 504 coupled to bus 501. In some systems, multiple microprocessor and/or microprocessor cores may be employed. Computer system 500 further includes a main memory 510, such as a random access memory (RAM) or other storage device, coupled to the bus 501 for storing information and instructions to be executed by microprocessor 504. A read only memory (ROM) 508 is coupled to the bus 501 for storing information and instructions for microprocessor 504. As another form of memory, a non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

Although the computer system 500 is often managed remotely via a communication interface 516, for local administration purposes the system 500 may have a peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry and logic for local buses such as Universal Serial Bus (USB) or other communication links.

Computer system 500 is coupled to a communication interface 516 that provides a link between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the microprocessor executing program code. Such code may be read from or stored on memory 510, ROM 508, or non-volatile storage device 506, which may be implemented in the form of disks, tapes, magnetic media, CD-ROMs, optical media, RAM, PROM, EPROM, and EEPROM. Any other non-transitory computer-readable medium may be employed. Executing code may also be read from network link 518 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G-(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for determining congestion status of a channel to end-user mobile devices in a mobile network, the method operable in a computer, the method comprising:
   a. receiving information from a plurality of mobile devices, the information indicating at least one of: current geographical location of each mobile device, and radio cell in a mobile network that each mobile device is currently connected to;
   b. synchronous to the receipt of the information in (a):
      (i) selecting a radio cell from amongst a plurality of radio cells;
      (ii) identifying a set of mobile devices that are currently connected to the selected radio cell, based on the received information;
      (iii) selecting a subset of the set of mobile devices for congestion measurement;
      (iv) with respect to the set of mobile devices, testing for congestion only between the computer and each of those mobile devices in the subset;
   c. assigning a congestion status to the selected radio cell, based on the results of the congestion testing between the computer and each of those mobile devices in the subset.

2. The method of claim 1, wherein testing for congestion comprises initiating an application layer data transfer from the computer to a particular mobile device.

3. The method of claim 1, wherein testing for congestion comprises instructing a particular mobile device to initiate an application layer data transfer to the computer.

4. The method of claim 1, further comprising requesting the information from the plurality of mobile devices.

5. The method of claim 1, wherein the selection of the subset of mobile devices is random.

6. The method of claim 1, wherein the computer communicates with a client application running on the mobile device to receive the information and to test for congestion.

7. The method of claim 1, further comprising: based at least in part on the determined congestion status, sending a push notification to one or more of the subset of mobile devices to initiate download of content.

8. A system for determining congestion status of a channel to end-user mobile devices in a mobile network, the system comprising:
   a computer having a microprocessor and memory storing computer readable instructions executable on the microprocessor to cause the computer to:
      a. receive information from a plurality of mobile devices, the information indicating at least one of: current geographical location of each mobile device, and radio cell in a mobile network that each mobile device is currently connected to;
      b. synchronous to the receipt of the information in (a):
         (i) select a radio cell from amongst a plurality of radio cells;
         (ii) identify a set of mobile devices that are currently connected to the selected radio cell, based on the received information;
         (iii) select a subset of the set of mobile devices for congestion measurement;
         (iv) with respect to the set of mobile devices, testing for congestion only between the computer and each of those mobile devices in the subset;
      c. assign a congestion status to the selected radio cell, based on the results of the congestion testing between the computer and each of those mobile devices in the subset.

9. The system of claim 8, wherein the computer is located external to a mobile network, the plurality of mobile devices being connected to radio cells in the mobile network.

10. A method for determining the congestion status of end-user mobile devices in a mobile network, the method operable at a computer, the method comprising:
identifying a set of mobile devices;
selecting, from the set, a subset of mobile devices for congestion testing;
at a particular time, requesting and receiving information from each of the mobile devices in the subset, the information indicating at least one of: current geographical location of particular mobile device, and which radio tower in a mobile network a particular mobile device is currently connected to;
at the particular time:
(i) selecting a radio cell from amongst a plurality of radio cells;
(ii) identifying those mobile devices in the subset that are currently connected to the selected radio cell, based on the received information;
(iii) testing for congestion from the computer to those mobile devices identified in step (ii);
assigning a congestion status to the selected radio tower, based on the results of the congestion testing to those mobile devices identified in step (ii).

11. The method of claim 10, wherein testing for congestion comprises initiating an application layer data transfer from the computer to a particular mobile device.

12. The method of claim 10, wherein testing for congestion comprises instructing a particular mobile device to initiate an application layer data transfer to the computer.

13. The method of claim 10, wherein the selection of the subset of mobile devices is random.

14. The method of claim 10, wherein the computer communicates with a client application running on the mobile device to receive the information and to test for congestion.

15. A system for determining congestion status of end-user mobile devices in a mobile network, the system comprising:
a computer having a microprocessor and memory storing computer readable instructions executable on the microprocessor to cause the computer to:
identify a set of mobile devices;
select, from the set, a subset of mobile devices for congestion testing;
at a particular time, request and receive information from each of the mobile devices in the subset, the information indicating at least one of: current geographical location of particular mobile device, and which radio tower in a mobile network a particular mobile device is currently connected to;
at the particular time:
(i) select a radio cell from amongst a plurality of radio cells;
(ii) identify those mobile devices in the subset that are currently connected to the selected radio cell, based on the received information;
(iii) test for congestion to those mobile devices identified in step (ii);
assign a congestion status to the selected radio tower, based on the results of the congestion testing to those mobile devices identified in step (ii).

16. The system of claim 15, wherein the computer is located external to a mobile network, the plurality of mobile devices being connected to radio cells in the mobile network.

17. A system for determining congestion status of a channel to end-user mobile devices in a mobile network, the system comprising:
a computer having a microprocessor and memory storing computer readable instructions executable on the microprocessor to cause the computer to:
a. receive information from a plurality of mobile devices, the information indicating at least one of: current geographical location of each mobile device, and base station in a mobile network that each mobile device is currently connected to;
b. synchronous to the receipt of the information in (a):
(i) select a base station from amongst a plurality of base stations;
(ii) identify a set of mobile devices that are currently connected to the selected base station, based on the received information;
(iii) select a subset of the set of mobile devices for congestion measurement;
(iv) with respect to the set of mobile devices, testing for congestion only between the computer and each of those mobile devices in the subset;
c. assign a congestion status to the selected base station, based on the results of the congestion testing between the computer and each of those mobile devices in the subset.

18. A system for determining congestion status of end-user mobile devices in a mobile network, the system comprising:
a computer having a microprocessor and memory storing computer readable instructions executable on the microprocessor to cause the computer to:
identify a set of mobile devices;
select, from the set, a subset of mobile devices for congestion testing;
at a particular time, request and receive information from each of the mobile devices in the subset, the information indicating at least one of: current geographical location of particular mobile device, and which radio tower in a mobile network a particular mobile device is currently connected to;
at the particular time:
(i) select a base station from amongst a plurality of base stations;
(ii) identify those mobile devices in the subset that are currently connected to the selected base station, based on the received information;
(iii) test for congestion to those mobile devices identified in step (ii);
assign a congestion status to the selected radio tower, based on the results of the congestion testing to those mobile devices identified in step (ii).

* * * * *